July 21, 1970  V. HEUSS  3,521,032
APPARATUS FOR COOKING FOOD
Filed June 7, 1967  5 Sheets-Sheet 3

United States Patent Office 3,521,032
Patented July 21, 1970

3,521,032
APPARATUS FOR COOKING FOOD
Valentin Heuss, Husacherstrasse 5, Uitikon,
Waldegg-Zurich, Switzerland
Continuation-in-part of application Ser. No. 433,126,
Feb. 16, 1965. This application June 7, 1967, Ser.
No. 657,444
Int. Cl. F27d 11/02
U.S. Cl. 219—400                              11 Claims

ABSTRACT OF THE DISCLOSURE

The apparatus has a housing in which the food is placed. Air is driven around a closed circuit within the housing by a fan while it is heated by an electric heater. At the end of a manually set period the heater is deenergized and the housing is opened. The fan motor is thereafter energized for a further period.

---

This application is a continuation-in-part of my earlier application Ser. No. 433,126, now abandoned.

This invention relates to apparatus for cooking food and has for its object the provision of an apparatus in which heat is transferred to the food otherwise than by hot water, steam, radiant heat or naturally convected heat.

Heat transfer by means of hot water or steam has a number of disadvantages. The preesence of hot water renders the apparatus not easily portable, the amount of water present in the apparatus requires to be checked, the heating of a body of water in addition to the heating of the food results in a low thermal efficiency, an inconvenient escape of steam to the atmosphere generally occurs and it is generally necessary to drain water away from the food after cooking.

Heat transfer by radiant heat generally results in an uneven heating of the food and, when this method of transfer is used, difficulty is encountered in controlling the amount of heat transferred.

Heat transfer by naturally convected heat has the disadvantage that air velocities are small and the transfer of heat to the food is, therefore, slow and uneven.

According to the invention there is provided an apparatus for cooking food comprising an openable housing which, when closed, forms a closed circuit for air within the housing and which, when open, permits food to be positioned in the closed circuit, an electric motor, a fan in the closed circuit operatively connected to the motor for forcibly circulating air around the closed circuit, an electric heater in the closed circuit and control means for initiating energization of the motor and the heater and for opening the housing and deenergizing the heater after a preset period, the motor being thereafter energized for a further period.

Preferably the apparatus further comprises temperature responsive means exposed to air in the closed circuit and connected to the heater for controlling energization of the heater to limit air temperature in the closed circuit.

The opening of the housing, and thus of the closed circuit, after the preset period and the continuation of a forced circulation of air over the food for a further period thereafter ensures that cold air is drawn into the housing after the termination of the preset period. This results in a rapid cooling of the surface of the food and enables the food to be handled without inconvenience. It also ensures that the air temperature in the interior of the housing is at a low value at the beginning of each cooking period.

Embodiments of the invention will now be described, by way of example, with reference to the accompanying drawings, of which:

Figure 1:
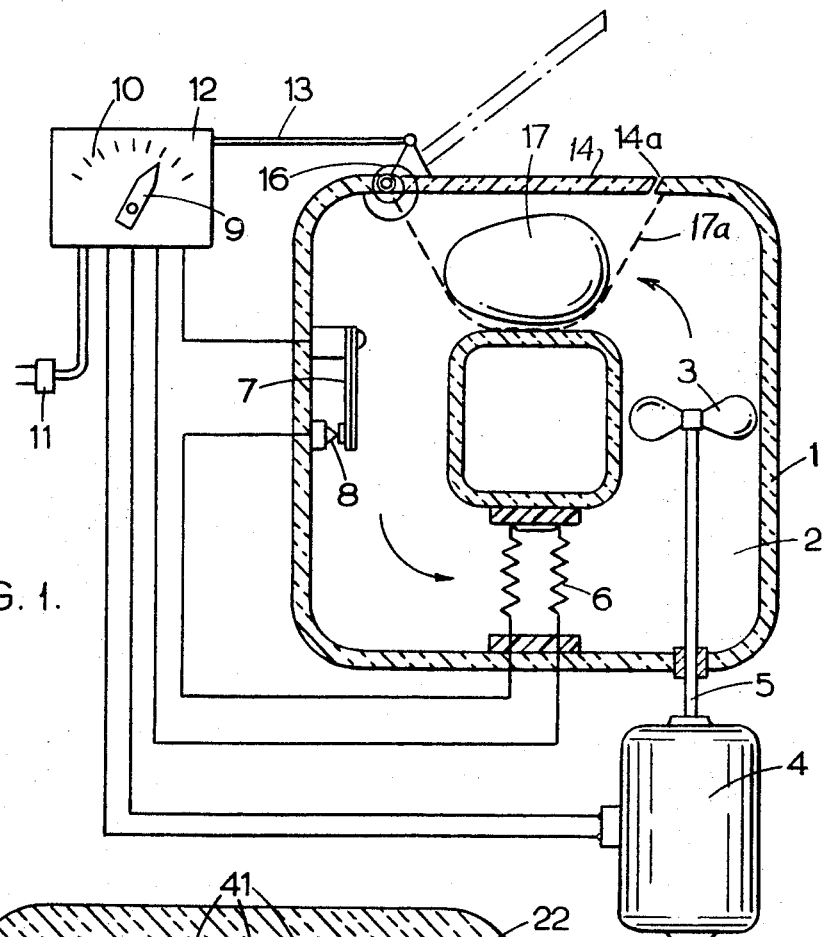
FIG. 1 is a schematic vertical cross section through an apparatus for cooking eggs.

In the apparatus of FIG. 1, a housing 1 encloses a substantially closed air circuit 2 in which is positioned a fan 3 mounted upon a shaft 5 operatively connected to an electric motor 4. Operation of the fan 3 causes air in the closed circuit to circulate in the direction of the arrows. An electric heater 6 is located in the air circuit 2 for heating the air therein. A thermostatic element 7 is also located in the air circuit 2 and is arranged to open when the air temperature therein exceeds a predetermined value. The thermostatic element is a bimetallic strip having an electric contact 8 which breaks an energizing circuit for the heater 6 when the predetermined temperature is exceeded. A controlling means comprises a timing means and switch means 12 having a rotary pointer 9 which is manually movable over a scale 10 for setting a desired preset cooking period. The timing means and switch means 12 controls energization of the motor 4 and heater 6 from a power source to which connector 11 is connected. The controlling means also comprises a movable member 13, pivotally linked to a cover member 14 which forms part of the housing 1. The cover member 14 is shown in a closed position in which it engages a seat 14a on the housing 1 to close the housing. The controlling means also comprises a spring 16 by means of which the cover member 14 is biassed from the closed position to an open position, indicated at 15, in which it is raised from the seat 14a.

When the cover member 14 moves to the open position the movable member also moves to the open position to prevent operation of the timing means and switch means 12. An egg 17, for example, may then be positioned beneath the cover member 14 within an egg holding means 17a and the cover member 14 may then be moved manually to engage the seat 14a. Movement of the cover member 14 to engage the seat 14a causes the movable member 13 to move to a closed position to initiate operation of the timing means and switch means 12. The controlling means thereupon energises the heater 6 for a preset period and the motor 4 for the preset period and for a further period thereafter. The controlling means also locks the movable member 13 in the closed position and thereby locks the cover member 14 in engagement with the seat 14a until the end of the preset period, when the movable member 13 is released and the cover member is lifted from the seat 14a under the influence of spring 16 to open the housing 1.

During the preset period air at the predetermined temperature is driven over the egg and at the termination of that period cold air is admitted to cool the egg rapidly.

Figure 2:
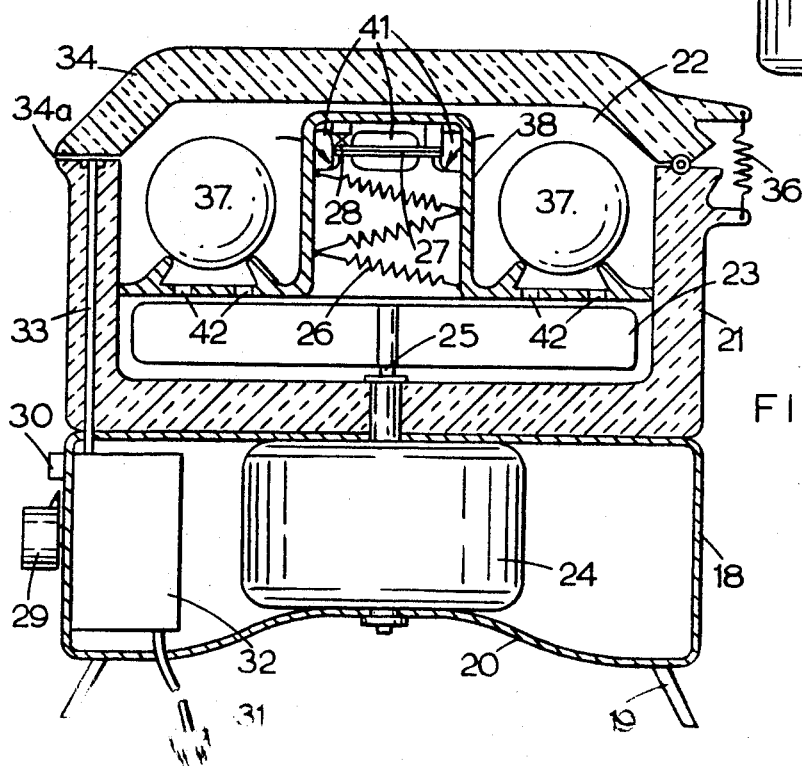
FIG. 2 is a vertical cross section through another form of an apparatus for cooking eggs.
Figure 3:
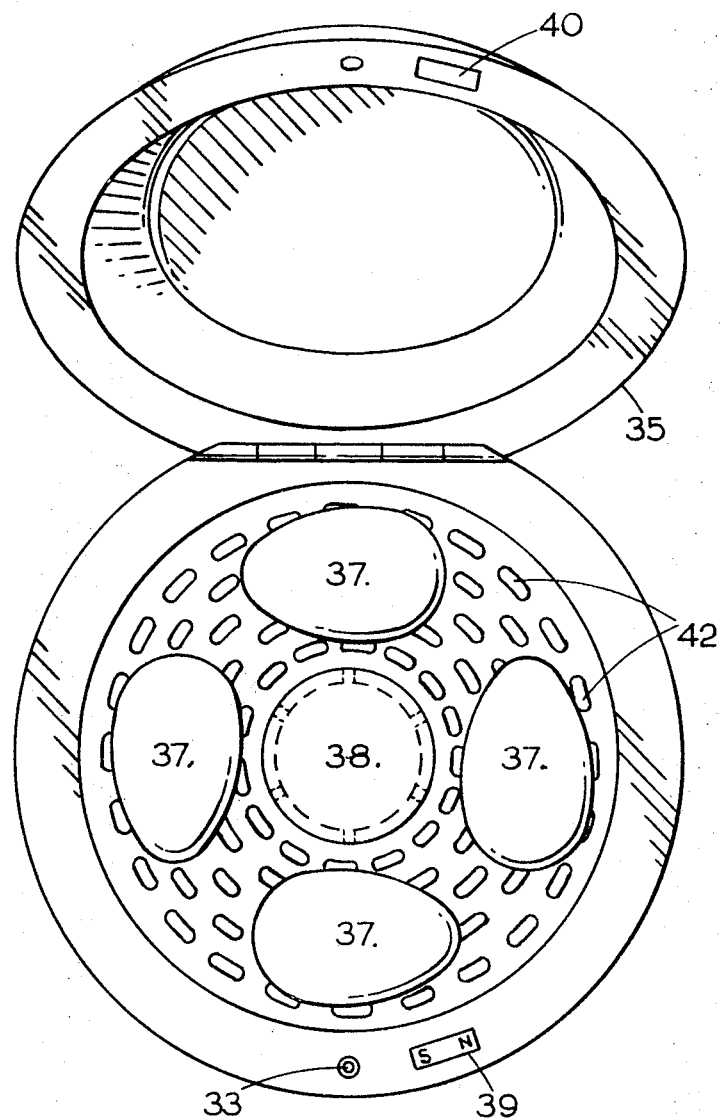
FIG. 3 is a plan view of the apparatus of FIG. 2.
Figure 4:
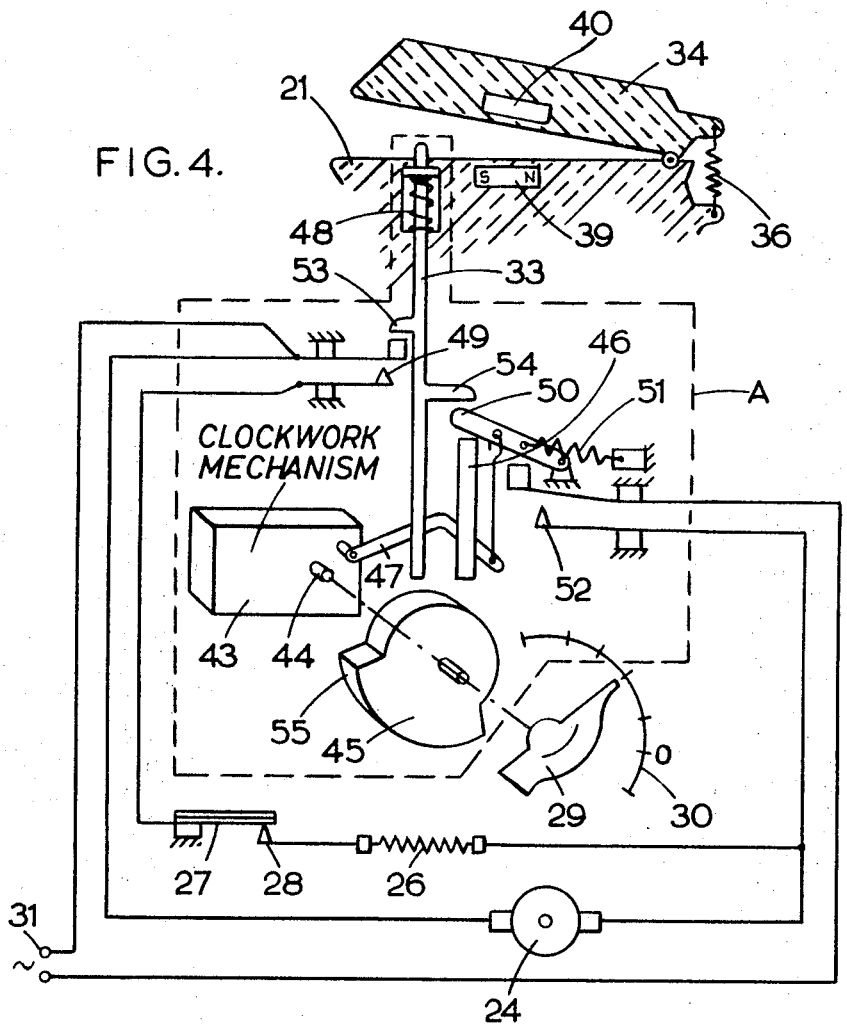
FIG. 4 is a partly schematic circuit diagram of the apparatus of FIGS. 2 and 3.

In the embodiment shown in FIGS. 2, 3 and 4, which is intended to have a pleasing appearance and convenient arrangement of parts, and which, moreover, is capable of cooking up to four eggs, the housing has substantially the form of a vertical cylinder consisting of a lower part 18, which accommodates a motor 24 and a timing means and switch means 32, and an upper part 21 of heat-insulating material, mounted upon the lower part 18 and enclosing a substantially closed air circuit 22. The lower part 18 is supported on legs 19. The motor 24 is mounted on the bottom 20 of the lower part 18. The power of the motor 24 is transmitted by means of a shaft 25 to a fan 23, which forcibly circulates the air in the air circuit 22 in the direction of the arrows. An electric heater 26 heats air in the closed circuit 22 and a bimetallic strip 27, having a contact 28 connected in series with the heater 26 causes interruption of energization of heater 26 when air in the closed circuit reaches a predetermined temperature of, for example, 120° C. The timing means and switch means 32 is provided with a rotary knob 29 and a scale 30 for setting the desired preset cooking period manually. The apparatus is connected to a power source by means of a mains plug 31, and energization of the motor 24 and heater 26 are controlled, as described above with reference to FIG. 1, by means of the timing means and switch means 32 which is described in detail below.

The cover member 34 of the housing 1 is so arranged that it is normally held in a housing-open position, in which it is raised from seat 34a, by a spring 36 but when it is moved to a housing-closed position by manual pressure, it is held in the housing-closed position under the influence of the mutual attraction of a magnet 39 and a keeper 40. When the cover member 34 engages the seat 34a a movable member in the form of a rod 33 is pressed downwardly against a slight spring force in order to give the timing means and switch means 32 a signal that the cooking cycle is to begin. At the end of the preset period, the rod 33 is pushed upwardly by the timing means and switch means 32, whereby the keeper 40 moves out of the range of attraction of the magnet 39 and the cover 35 jumps from a housing-closed position into the housing-open position under the influence of the spring 36. A cylinder 38, having a covered top, upports, but is insulated from the heater 26 and bimetallic strip 27 and is provided with ports 41 near its top through which air may be forced by the fan 23. The cylinder 38 serves to prevent an operator touching live parts of the electrical circuit.

The space in which the eggs are contained is separated from the fan 23 by a grid 42, so that contact with the fan 23 is impossible. At the same time, the grid 42 is so designed that it holds the eggs 37 in a well-defined position.

In FIG. 4, the parts enclosed within the dash-line box A are referred to above as a controlling means. These parts are shown in exploded form in FIG. 4 and comprise a timing means in the form of a clockwise mechanism 43 having an output shaft 44 and a locking lever 47 and which is manually wound by turning knob 29 in a counterclockwise direction. The controlling means also comprises a movable member in the form of a rod 33 and a spring 48, the rod 33 being normally urged upwardly by the spring to an open position. In the position shown, the locking lever 47 keeps the clockwork mechanism 43 locked. After the eggs have been put in, the cover member 43 is moved to a housing-closed position by pressure against the force of a spring 36 and the rod 33 is thereby pushed downward to a closed position. At the same time, the attraction between the magnet 39 and the keeper 40 causes the cover member to remain in the housing-closed position and the rod 33 to remain in its depressed position. The rod 33 is provided with a lug 54 which engages a rocking lever 50 during downward movement of the rod 33. The rocking lever 50 is rendered bistable by means of a spring 51 and engagement of the rocking lever 50 by the lug 54 causes the rocking lever to assume its lower stable position and thereby move the locking lever 47 to a position in which the clockwork mechanism 43 is released so that the latter begins to run down. The controlling means also comprises normally open contacts 49 and 52. The downward movement of the lever 50 also causes closing of the contact 32, whereby an energizing circuit of the motor 24 is completed. The rod 33 is also provided with a second lug 53 which, during downward movement of the rod 33, causes contact 49 to close to complete an energizing circuit for heater 26. Thus the closing of the cover member 34 sets the motor 24, the heater 26 and the clockwork mechanism 43 in operation.

Whenever the air in the closed circuit 22 has reached the desired predetermined temperature, the bimetallic strip 27 interrupts the circuit of the heater by opening the contact 28. Thus, during the preset period determined by the position of the knob 29, air at this predetermined temperature flows round the eggs and in this way they are cooked. At the end of the preset cooking period, when the pointer of the knob has arrived at the point 0 of the scale 30, a cam face 55 on a cam 45 mounted on the output shaft 44 pushes the rod 33 upward again, thereby causing the keeper 40 to be raised out of the range of action of the magnet 39, so that the cover member 34 moves automatically to a housing-open position under the effect of the spring 36. At the same time, upward movement of lug 53 permits the contact 49 to open to deenergize the heater 26. The rocking lever 50, however, remains in its lower stable position, contact 52 remains closed and the motor 24 continues to run with the cover 34 in its housing-open position. Cold air is therefore forced over the eggs for a further period until the cam face 55 pushes an auxiliary rod 46 upwards to cause the rocking lever 50 to be moved to its upper stable position and so permit the contact 52 to open to deenergize the motor 24. The entire process is now at an end and the cooked eggs can be removed. After the desired cooking time has been set by means of the knob 29, the cover 34 can be closed over freshly introduced eggs, whereupon the process recommences.

The apparatus described above may be employed for cooking any other suitable food by a similar cooking cycle.

Figure 4A:
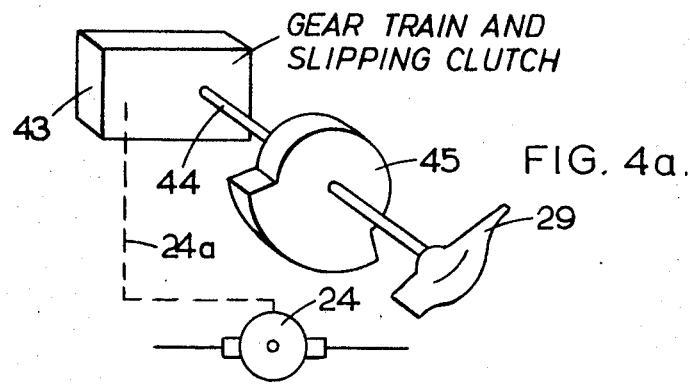
FIG. 4a is a schematic diagram showing a modification of part of FIG. 4.

The arrangement described above with reference to FIG. 4 may be modified, as shown in FIG. 4a, by arranging that the motor 24 drives, as indicated by the dotted line 24a, a combined gear train and slipping clutch mechanism 43 having an output shaft 44 and by removing the locking lever 47.

In operation, the knob 29, shaft 44 and cam 45 are turned manually in an anti-clockwise direction against resistance due to the slipping clutch and the cover member 34 is moved to its housing-closed position to cause motor 24 to be energized to drive shaft 44 in a clockwise direction to cause the arrangement to operate as described above with reference to FIG. 4.

Figure 5:
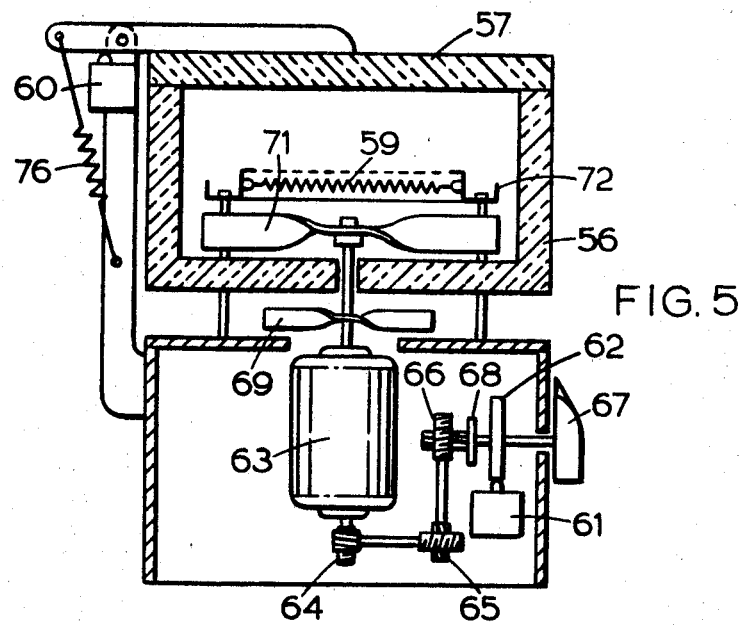
FIG. 5 is a schematic vertical cross section of another apparatus for cooking eggs.
Figure 6:
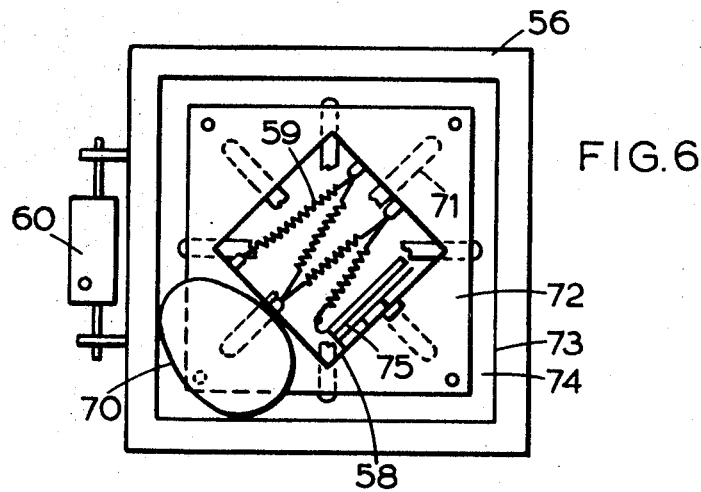
FIG. 6 is a plan view of the apparatus shown in FIG. 5 with a cover removed.
Figure 7:
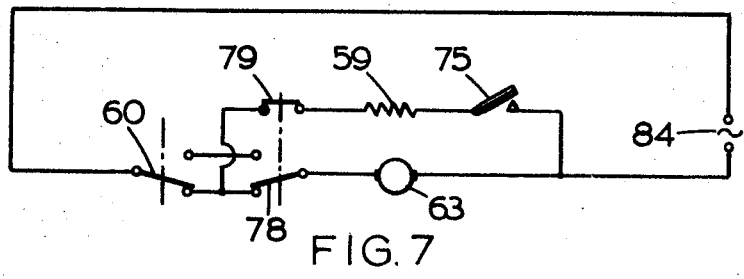
FIG. 7 is a circuit diagram of the apparatus shown in FIGS. 5 and 6.

The apparatus shown in FIGS. 5 to 7 operates in a manner generally similar to that of the apparatuses shown in the earlier drawings. In this apparatus a rectangular housing 56 has an openable cover 57 and a plate 72 supported by the base of the housing 56, the dimensions of the plate 72 being such that there is a space 74 between the plate 72 and the wall 73 of the housing 56. The plate 72 is intended to support around its periphery a number of eggs to be cooked and one egg 70 is shown in FIG. 6 only for the purposes of illustration. It will be seen that part of this egg covers the space 74. The plate 72 also has a central rectangular hole 58 cut in it with the sides of the hole at 45° to the sides of the plate 72. A heater 59 is stretched across the hole 58 and is connected in series with an air thermostat 75 (not shown in FIGS. 5 and 6). The cover 57 is pivotally mounted, is urged into its open position by a tension spring 76; and is arranged to actuate a change over microswitch 60 which is in one position in the closed position of the cover 57. A fan 71 having eight blades is situated beneath the plate 72 and is mounted on the shaft of a constant speed electric motor 63 which also carries a cooling fan for the motor. The motor 63 drives a cam 62 and a manually operable knob 67 through three sets 64, 65 and 66 of step down worm and wheel gears and a friction clutch 68. The knob 67 cooperates with a scale labelled in units of time with a range of say 6 minutes. The cam 62 operates a further change over microswitch and a pair of contacts all indicated by the reference numeral 61 in FIG. 5 and by the reference numerals 78 and 79 respectively in FIG. 7.

The fan 71 when the motor 63 is energized creates a flow of air within the container 56 and if the cover 57 is closed the air passes through a closed circuit which includes the space 74 and the hole 58, the air passing downwards through the hole 58 and upwards through the space 74. It is to be noted that there is no obstruction such as baffles to the air flow or vortex described and that the eggs lie in this air flow or vortex. The effect of the air flow or vortex is to apply a suction to the cover 57 which is sufficient to maintain it closed against the action of the spring 76 after manual closure.

Referring now to FIG. 7, each of the two fixed contacts of the change over switch 60 is connected to one of the fixed contacts of the change over switch 78. The switch 79, the heater 59 and the thermostat 75 are connected in series between the lower connected fixed contacts of the change over switches 60 and 78 and one side of any A.C. supply 84. The motor 63 is connected between that side of the supply 84 and the movable contact of the change over switch 78. The other side of the supply 84 is connected directly to the movable contact of the change over switch 60.

The operation of the apparatus shown in FIGS. 5 to 7 is as follows. The eggs to be cooked are placed in position and the knob 67 is rotated to set the cooking time. The cover 57 is then closed and in this position the switches 60, 78 and 79 are in the position shown in FIG. 7 with contacts 79 closed and the movable contacts of switches 60 and 78 in engagement with their respective lower fixed contacts. Bimetallic thermostat 75 (shown in the open position) is initially in the closed position and heater 59 is connected in parallel with motor 63. The motor 63 is energized so that the air flow is established by the fan 71 and the cover held closed by the suction of the air flow, and the heater 59 is energized heating the air circulated so that the eggs 70 are cooked. The bimetallic thermostat 75 regulates the air temperature in known fashion and it is desirable to use a cooking temperature well above 100° C. to obtain short cooking times. Thermostat 75 opens (as shown in FIG. 7) when the air temperature exceeds a predetermined value. At the end of the set period the cam 62 operates the microswitch 61 i.e. it opens contacts 79 de-energizing the heater 59 and moves the movable contact of switch 78 into engagement with its upper fixed contact deenergizing motor 63. The air flow therefore stops and the cover 57 opens. As the cover opens it actuates the switch 60 to move its movable contact into engagement with its upper fixed contact reenergizing the motor 63. The fan 71 then creates an air flow which cools the eggs and causes the air temperature of the interior of the housing 56 to fall until the motor 63 is again deenergised after a set period by the cam 62 again operating the microswitch 61 (78 and 79). The eggs 70 may then be removed and the cycle can then be repeated. The provision of a fixed cooling period ensures that the air in the housing 56 is at a known temperature at the beginning of each cycle ensuring that the eggs are not overcooked.

Figure 8:
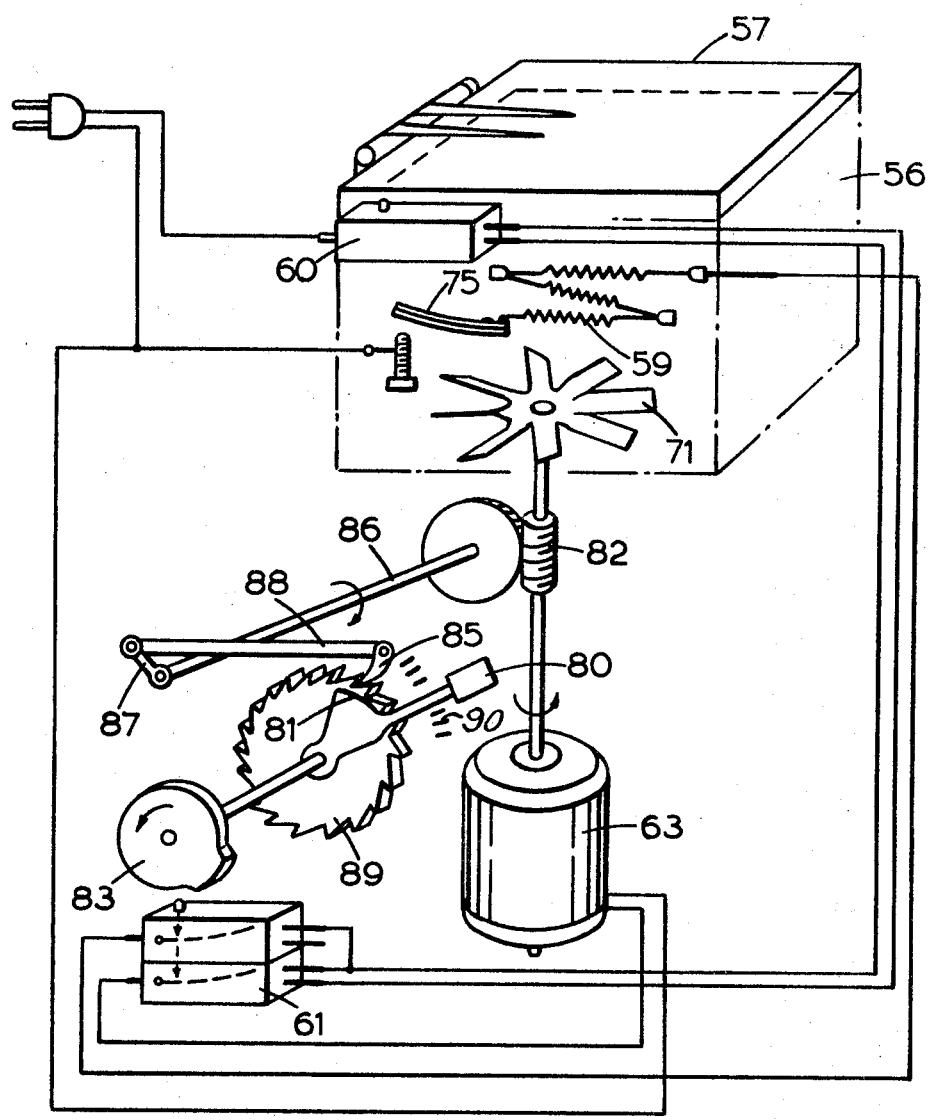
FIG. 8 is an exploded view of yet another apparatus which is similar to that shown in FIGS. 5 to 7.

The apparatus shown in FIG. 8 only differs from that shown in FIGS. 5 to 7 in the transmission between the motor 63 and the cam (in this figure designated by the numeral 83) which operates the microswitch 61. Hence, it is to be understood that all of the details in FIG. 8 of housing 56 including the apparatus in the interior thereof and the electrical wiring thereof is the same as the details in FIGS. 5 and 6 of housing 56 including the apparatus in the interior thereof and the electrical wiring thereof. The electrical functioning of switches 60, 61, electrical heater 59, electrical motor 63 and temperature switch 75 is the same in FIGS. 5 and 8 as represented in FIG. 7. In FIG. 8 case motor 63 drives a reciprocating pawl 85 through a worm and worm wheel gear set 82, a shaft 86, a crank 87 and a link 88. The pawl 85 cooperates with a ratchet wheel 89 which drives the cam 83. The number of teeth of the ratchet wheel 89 which the pawl 83 passes over during each stroke is regulated by a cam 81. The position of the cam 81 which is manually settable, thus regulates the overall step down ratio between the motor 63 and the cam 83. The cam 81 has an extension 80 which is manually movable and rests against a scale 90.

What is claimed is:

1. An apparatus for cooking food comprising a housing having a movable cover member defining, in its closed position, a substantially enclosed chamber within the housing and, in its opened position, permitting food to be placed within the interior of the housing; a fan rotatably mounted to said housing and positioned to move a stream of air within the interior of said housing; a motor mounted to said housing and rotatably driving said fan; means mounted to said housing for supporting food to be cooked in the stream of air moved by said fan within the interior of said housing; and an electric circuit insulated from electrically conductive portions of said housing and comprising: (a) said motor; (b) an electric heater mounted to said housing and within the interior thereof and in the stream of air moved by said fan; and (c) control means mounted to said housing and actuated by the closing of said cover member for energizing said electrical circuit and electric heater for a selected period of time at the end of which time said control means actuates the opening of said cover member and de-energizes said electrical circuit and said electric heater, said control means also maintaining the energization of said motor for a selected period of time after said cover member is opened for ventilating the interior of said housing with outside air brought in by said fan to reduce the interior housing temperature to a predetermined level, whereby each of consecutive batches of food, such as eggs, will be cooked to the same degree.

2. An apparatus as claimed in claim 1 which comprises temperature responsive means mounted to said housing and exposed to the air moved by said fan in the interior of said housing and connected to said electric heater for controlling energization thereof to limit the air temperature in the air stream moved by said fan.

3. An apparatus as claimed in claim 1 wherein said housing comprises a seat engaged by said cover member when said housing is closed, said fan being positioned so as to produce a force holding said cover member against said seat when said housing is closed and said fan is actuated, said control means comprising a cam, a transmission which permits reverse movement and which couples said cam to be driven by said motor, first and second switches operable respectively by said cover member and said cam, manually operable means for positioning said cam relative to said second switch, said second switch having first and second movable contacts actuated by said cam which respectively control the energization of said motor and said heater.

4. An apparatus as claimed in claim 3 wherein said transmission includes a friction clutch.

5. An apparatus as claimed in claim 3 wherein said transmission includes a pawl and ratchet wheel.

6. An apparatus as claimed in claim 5, wherein said transmission includes means for altering the angular motion of the ratchet wheel for each stroke of the pawl.

7. An apparatus as claimed in claim 1 wherein the housing comprises a cover member and a seat engaged by the cover member when the housing is closed, and wherein the control means comprises a movable member linked to the cover member for movement to a closed position when the cover member engages the seat and to an open position when the cover member is raised from the seat, movement of the movable member to the closed position initiating operation of the control means, the control means moving the movable member to the open position after the preset period and movement of the movable member to the open position lifting the cover member from the seat.

8. An apparatus as claimed in claim 1 wherein the housing comprises a cover member and a seat engaged by the cover member when the housing is closed, and wherein the control means further comprises a member movable between a closed and an open position, movement of the cover member to engage the seat causing the cover member to engage the movable member to move it to the closed position, movement of the movable member to the closed position initiating operation of the control means, the control means moving the movable member to the open position after the preset period and movement of the movable member to the open position lifting the cover member from the seat.

9. An apparatus as claimed in claim 8 wherein the control means further comprises first and second switches controlling energization of the heater and motor respectively, and a timing means arranged for manual presetting of the preset period, the timing means being rendered operative and the switches being closed by movement of the movable member to the closed position, the timing means moving the movable member to the open position after the preset period to open the first switch, the timing means opening the second switch a further period thereafter.

10. An apparatus as claimed in claim 9 wherein the timing means comprises a clockwork mechanism arranged to be wound up by said manual presetting.

11. An apparatus as claimed in claim 9 wherein the timing means has driving connection with the motor for driving the timing means in one direction to measure the preset period and with a manually movable member for driving the timing means in a reverse direction to preset the preset period.

References Cited

UNITED STATES PATENTS

| 2,248,867 | 7/1941 | Hallman | 219—400 |
| 2,491,420 | 12/1949 | Scott | 219—400 |
| 2,862,096 | 11/1958 | Gordon | 219—400 |
| 2,907,859 | 10/1959 | Walkoe | 219—412 |
| 2,214,630 | 9/1940 | Wheeler | 219—400 |
| 3,259,996 | 7/1966 | Hull et al. | 219—400 X |

FOREIGN PATENTS

| 934,357 | 1/1948 | France. |

VOLODYMYR Y. MAYEWSKY, Primary Examiner

U.S. Cl. X.R.

219—412